United States Patent
Knop et al.

(10) Patent No.: US 7,724,648 B2
(45) Date of Patent: May 25, 2010

(54) SYSTEM AND METHOD FOR MONITORING THE FUNCTIONALITY OF NETWORK INTERFACES

(75) Inventors: Felipe Knop, Poughkeepsie, NY (US); Paul D. Moyer, Catskill, NY (US)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 11/843,297

(22) Filed: Aug. 22, 2007

(65) Prior Publication Data

US 2007/0286219 A1 Dec. 13, 2007

Related U.S. Application Data

(62) Division of application No. 10/622,824, filed on Jul. 18, 2003, now Pat. No. 7,359,335.

(51) Int. Cl.
*H04L 12/26* (2006.01)

(52) U.S. Cl. .................. 370/216; 370/217; 370/218; 370/219; 370/220; 370/221; 370/242; 370/243; 370/244; 370/245; 370/254; 709/24

(58) Field of Classification Search ......... 370/216–221, 370/242–245, 254; 709/24
See application file for complete search history.

(56) References Cited

U.S. PATENT DOCUMENTS

| | | | |
|---|---|---|---|
| 5,452,287 A | | 9/1995 | DiCecco et al. |
| 5,535,336 A | * | 7/1996 | Smith et al. .................. 709/225 |
| 5,751,971 A | | 5/1998 | Dobbins et al. |
| 5,805,785 A | | 9/1998 | Dias et al. |
| 6,195,760 B1 | | 2/2001 | Chung et al. |
| 6,208,616 B1 | * | 3/2001 | Mahalingam et al. ....... 370/216 |
| 6,392,990 B1 | * | 5/2002 | Tosey et al. .................. 370/218 |

(Continued)

FOREIGN PATENT DOCUMENTS

JP 01-151854 6/1989

(Continued)

OTHER PUBLICATIONS

U.S. Appl. No. 09/694,586, filed Oct. 2000, Block et al.

*Primary Examiner*—William Trost, IV
*Assistant Examiner*—Toan D Nguyen
(74) *Attorney, Agent, or Firm*—Fleit Gibbons Gutman Bongini & Bianco, PL

(57) ABSTRACT

A system, method and computer readable medium are provided for monitoring functionality of multiple network interfaces and providing fault recovery. The network interfaces are grouped into nodes and a monitoring address is assigned to each of the network interfaces such that the monitoring address for each of the network interfaces is on a different subnet than the monitoring addresses for all of the other network interfaces in the same node as that network interface. According to the method, each of the network interfaces is assigned one or more recovery addresses that each are different than its monitoring address. A monitoring message is periodically sent to each of the network interfaces via the monitoring addresses in order to determine the functionality of the network interfaces. If no monitoring message is received within a predetermined period, a recovery operation is performed for one of the network interfaces using one or more recovery addresses of the one network interface.

5 Claims, 8 Drawing Sheets

U.S. PATENT DOCUMENTS

| | | |
|---|---|---|
| 6,393,485 B1 | 5/2002 | Chao et al. |
| 6,578,087 B1 * | 6/2003 | Garakani et al. ............ 709/242 |
| 6,747,957 B1 | 6/2004 | Pithawala et al. |
| 7,085,224 B1 * | 8/2006 | Oran ......................... 370/216 |
| 2002/0165977 A1 | 11/2002 | Novaes |
| 2002/0188891 A1 | 12/2002 | McBrearty et al. |
| 2003/0005125 A1 | 1/2003 | Berthaud et al. |

FOREIGN PATENT DOCUMENTS

| | | |
|---|---|---|
| JP | 04-177924 | 6/1992 |
| JP | 04-207243 | 7/1992 |
| JP | 07-023045 | 1/1995 |
| JP | 2000-151640 | 5/2000 |
| JP | 2003-078526 | 3/2003 |

* cited by examiner

SYSTEM AND METHOD FOR MONITORING THE FUNCTIONALITY OF NETWORK INTERFACES

CROSS-REFERENCE TO RELATED APPLICATIONS

This is a divisional of application Ser. No. 10/622,824, filed Jul. 18, 2003, now U.S. Pat. No. 7,359,335.

BACKGROUND OF THE INVENTION

1. Field of the Invention

This invention generally relates to the field of cluster multiprocessing, and more specifically to monitoring of cluster computers for availability.

2. Description of Related Art

Clustering servers enables parallel access to data, which can help provide the redundancy and fault resilience required for business-critical applications. Clustering applications, such as High Availability Cluster Multi-Processing (HACMP) provided by International Business Machines (IBM) of Armonk, N.Y., provide tools to help install, configure and manage clusters in a highly productive manner. HACMP provides monitoring and recovery of clustered computer resources for use in providing data access and backup functions (e.g., a mission critical database). HACMP also enables server clusters to be configured for application recovery/restart to provide protection for business-critical applications through redundancy.

Cluster monitoring applications, such as Reliable Scalable Cluster Technology (RSCT) provided by IBM, provide error detection for TCP/IP based computer networks. RSCT is a clustering infrastructure that can be used by HACMP for providing higher-level recovery functions. RSCT sends messages, known as heartbeat messages, across each network interface connected to the network. When heartbeat messages are no longer received via a particular network interface, that network interface is considered dead or unconnected. The heartbeat technology requires that the RSCT software be able to direct heartbeat messages through a specific network interface. For this purpose, the IP address for each network interface must meet certain requirements so that the IP layer of the operating system will always direct the heartbeat message to the desired network interface. One of the requirements of the heartbeat technology is that each network interface on a node must be on a different subnet than all other network interfaces on that node.

More specifically, when a message is sent to an address, the IP layer routes that message to a network interface based on the destination address and the configuration of that network interface. This is known as "subnet routing" and the addresses involved must be organized in the proper subnets so that the routing layer directs the message to that specific network interface. Otherwise, if two addresses on the same node are in the same subnet, the routing function can send the messages across either of network interfaces (e.g., by always using one interface or the other, or by alternating between the interfaces), so the heartbeat function cannot monitor the individual network interfaces.

This address requirement creates a difficulty when complex or large networks are involved. For example, with 8 or more network interfaces per node as is now common, many subnets must be supplied. Manually assigning the proper subnet ranges and maintaining the addresses is non-trivial, especially with any network changes or maintenance. Further, this is only a requirement so that the RSCT software can make accurate determinations of individual network interface functionality.

HACMP software uses RSCT for monitoring network interfaces and provides "high availability" of network addresses by moving network addresses between network interfaces in response to failures. The process of moving the network address to a backup network interface is known as "recovery". Users of HACMP must provide certain information about the network to HACMP, such as a list of the network interfaces connected to the network and corresponding network addresses, such that HACMP can properly perform the recovery function.

Currently, HACMP passes the above network information to RSCT for use in the heartbeat function. A drawback with this configuration is that in order to properly perform the heartbeat function the network addresses and network interfaces must conform to certain rules, such as requiring each network interface address in each node to be located on a separate subnet. These rules, however, are not necessarily required in the context of the recovery function. Regardless, because of their necessity to the heartbeat function, the user must define network interface addresses for recovery such that they meet the requirements for the heartbeat function.

Therefore a need exists to overcome the problems discussed above, and particularly for a way to more efficiently monitor availability of computers in a cluster.

SUMMARY OF THE INVENTION

Briefly, in accordance with the present invention, disclosed is a system, method and computer readable medium for configuring network interfaces for monitoring functionality of the network interfaces, with the network interfaces being grouped into nodes. According to the method, a base address and subnet mask for the network interfaces are received, and a monitoring address is automatically generated for each of the network interfaces based on the base address, the subnet mask, and the nodes. The monitoring addresses is generated such that the monitoring address for each of the network interfaces is on a different subnet than the monitoring addresses for all of the other network interfaces in the same node as that network interface. Additionally, the monitoring addresses are assigned to the network interfaces for use by a monitoring process, with each of the monitoring addresses being assigned by being added as an additional network interface address of its network interface.

Also disclosed is method for monitoring the functionality of network interfaces and providing fault recovery. The network interfaces are grouped into nodes and a monitoring address is assigned to each of the network interfaces such that the monitoring address for each of the network interfaces is on a different subnet than the monitoring addresses for all of the other network interfaces in the same node as that network interface. According to the method, a monitoring message is periodically sent to each of the network interfaces via the monitoring addresses in order to determine the functionality of the network interfaces. If no monitoring message is received within a predetermined period, a recovery operation is performed for one of the network interfaces using one or more recovery addresses of the one network interface. Each of the network interfaces is assigned one or more recovery addresses that each are different than its monitoring address.

Accordingly, preferred embodiments of the present invention allow for the seamless allocation of monitoring addresses to network interfaces in a cluster computer environment. A user can allocate base addresses to the network interfaces without regard to any monitoring address requirements. Subsequently, static monitoring addresses are automatically allocated to the network interfaces, with the monitoring addresses adhering to the address requirements of the monitoring process.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the left-most digit of a reference number identifies the drawing in which the reference number first appears.

DETAILED DESCRIPTION OF PREFERRED EMBODIMENTS

1. Overview

The present invention, according to a preferred embodiment, overcomes the above-described problems by providing efficient and easy-to-implement methods for configuring and monitoring network interfaces and computers.

One advantage of the present invention is that it provides a method for automatic configuration and management of network interface addresses for monitoring. The present invention automatically generates network interface addresses for monitoring. Another advantage of the present invention is that the generated network interface addresses are guaranteed to meet the requirements of the monitoring process. Thus, the user need not understand the underlying monitoring technology and the networking requirements for the monitoring process.

Yet another advantage of the present invention is that network interface addresses are separate from recovery addresses (i.e., network interface addresses used during recovery) since the recovery addresses need not comply with the stricter requirements for use by the monitoring process. Users need only understand the recovery process. Another advantage is that the user need not change existing network topology in order to use the monitoring and recovery processes. A user implementing the monitoring process in an existing network environment need not change the existing network topology should it not meet the requirements for the monitoring process.

Yet another advantage of the present invention is that the management of network interface addresses during recovery is greatly simplified. With conventional network interface IP address recovery, the recovery process must communicate to the monitoring process any changes in network interface addresses, or the monitoring process will interpret an address change for recovery as a network interface failure. While conventionally the monitoring process must track network interface address changes as they are moved between network interfaces, the separation of the network interface addresses for monitoring from the recovery addresses simplifies coordination. The network interface address for monitoring is invariant for the network interface, so the monitoring process no longer needs to track network interface address movement between adapters. This improves the overall efficiency of the system.

Figure 1:
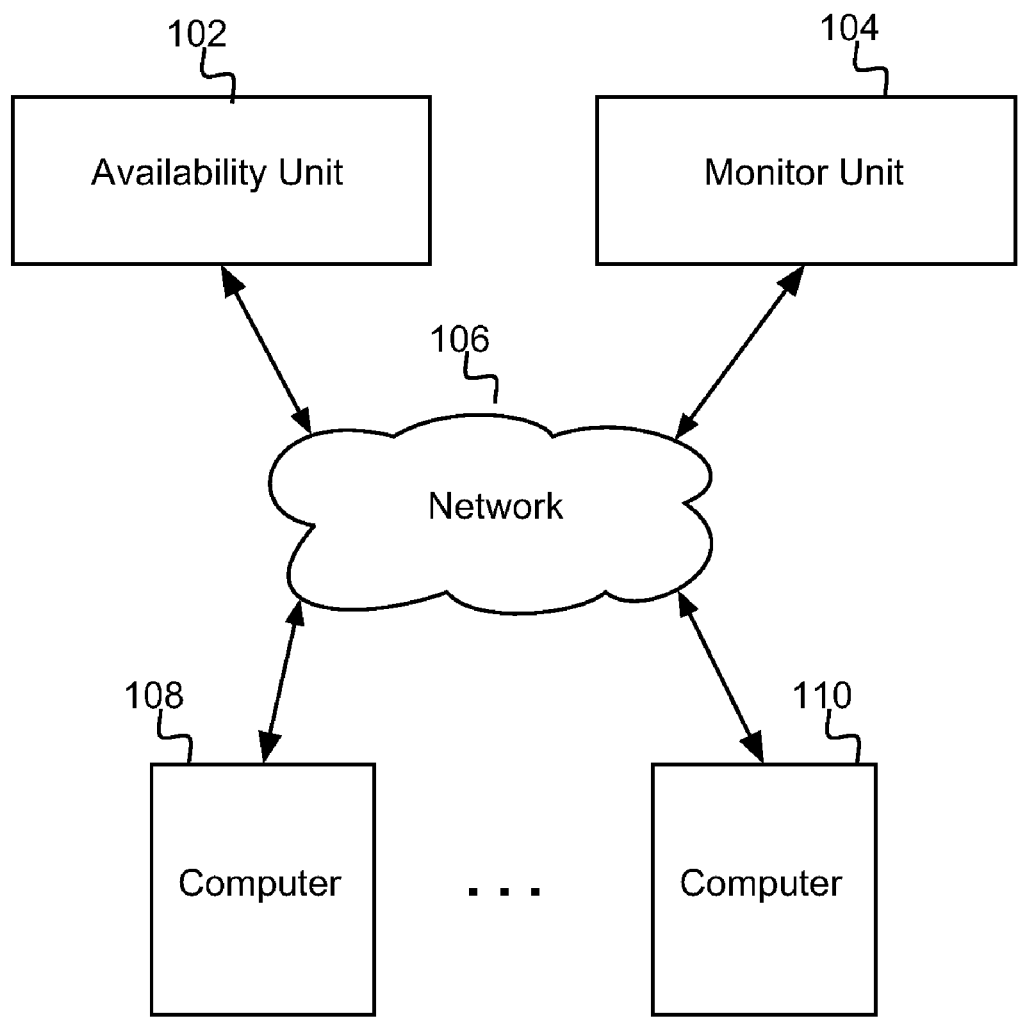
FIG. 1 is a block diagram illustrating the overall system architecture of a conventional computer cluster.

FIG. 1 is a block diagram illustrating the system architecture of a conventional computer cluster. The exemplary embodiments of the present invention described herein use such a system architecture. An availability unit 102 provides availability and recovery functions (such as a recovery process) for the computers 108 through 110 in a cluster on a network 106. The HACMP product of IBM is an example of an availability unit 102. A monitor unit 104 provides monitoring functions (such as a monitoring process) for the computers 108 through 110 in the cluster on network 106. The RSCT product of IBM is an example of a monitor unit 104. While only two computers 108 and 110 are shown in FIG. 1, in the preferred embodiment the availability unit 102 and monitor unit 104 support a cluster of up to 32 computers 108 through 110 (or nodes). In further embodiments of the present invention, any number of cluster computers 108 through 110 is supported.

In some embodiments of the present invention, the computer systems of availability unit 102, monitor unit 104 and computers 108 through 110 include one or more Personal Computers (PCs) (e.g., IBM or compatible PC workstations running the Microsoft Windows operating system, Macintosh computers running the Mac OS operating system, or equivalent), Personal Digital Assistants (PDAs), game consoles or any other information processing devices. Additionally, in some embodiments, the computer systems of availability unit 102, monitor unit 104 and computers 108 through 110 include a server system (e.g., SUN Ultra workstations running the Solaris operating system or IBM RS/6000 workstations and servers running the AIX operating system). In preferred embodiments, the availability unit 102 and the monitor unit 104 are processes running on one of the computers 108 through 110 of the cluster, or on one or more additional computers or servers that are connected to the network 106. The computer systems of availability unit 102, monitor unit 104 and computers 108 through 110 are described in greater detail below with reference to FIG. 7.

In the preferred embodiment, the network is a packet switched network utilizing the Internet Protocol (or IP). The packet switched network is a wide area network (WAN), such as the global Internet, a private WAN, a local area network (LAN), a telecommunications network or any combination of the above-mentioned networks. In further embodiments, any protocol can be used and the network can be a wired network, a wireless network, a broadcast network, a point-to-point network, or a circuit switched network (e.g., the Public Service Telephone Network).

Figure 2:
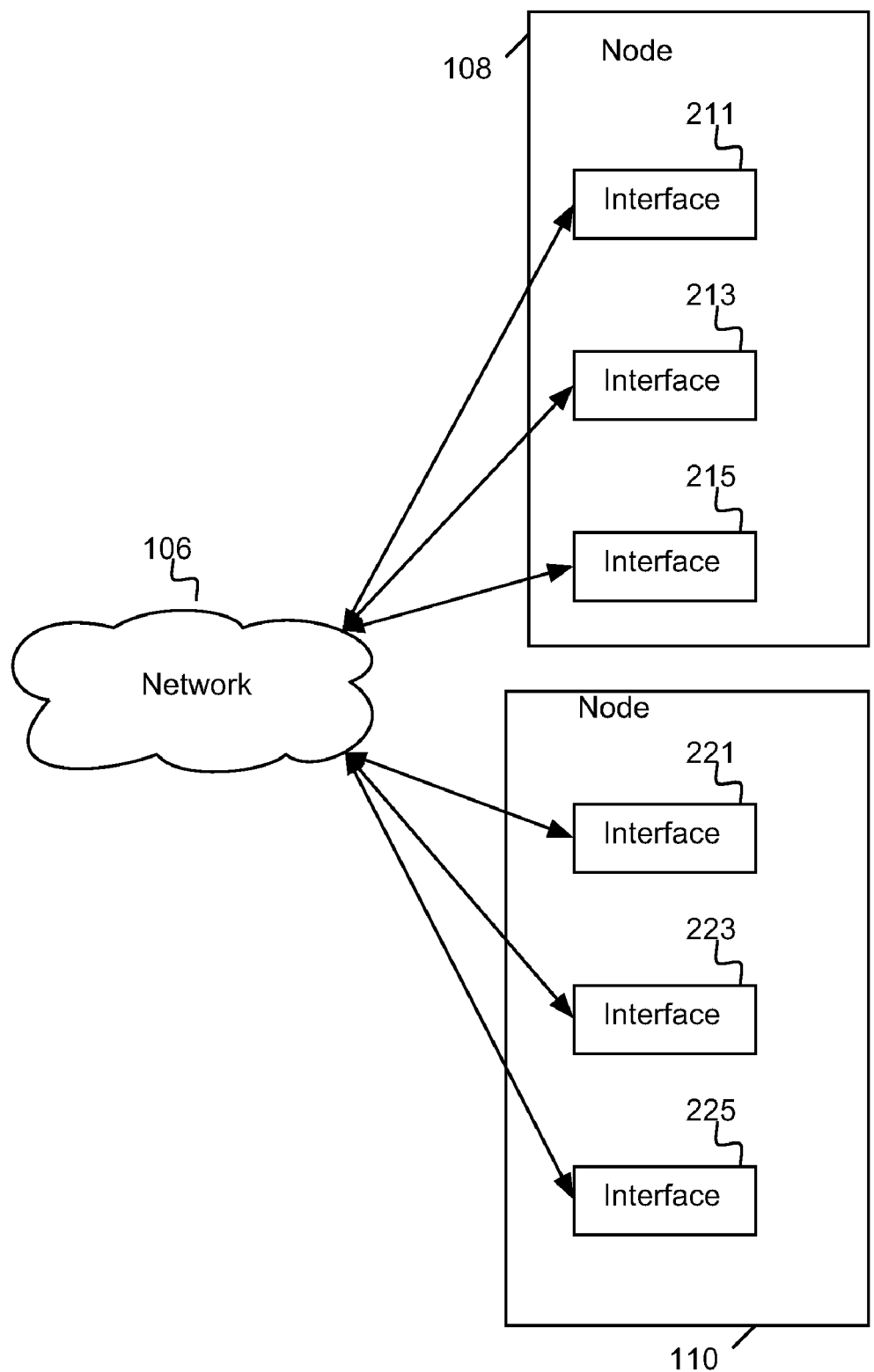
FIG. 2 is a more detailed block diagram of a portion of the computer cluster of FIG. 1.

FIG. 2 is a more detailed block diagram of a portion of the computer cluster of FIG. 1. FIG. 2 shows the computers 108 and 110 of FIG. 1 connected to the network 106. As shown, in this illustrative embodiment computer 108 is connected to network 106 via three network interface adapters 211, 213, and 215. Similarly, computer 110 is connected to network 106 via three network interface adapters 221, 223, and 225. A network interface adapter, often abbreviated as NIC, is an expansion board, PCMCIA card, built-in device or some other module coupled to a computer so as to interface the computer with a network 106. Most NICs are designed for a particular type of network, protocol, and media, although some can serve multiple networks. One example of a NIC is an Ethernet adapter for connecting a computer to a network using the TCP/IP protocol. In this document, the term "network interface" is used interchangeably with "network interface adapter," "adapter," "network interface card" and "NIC."

The computers 108 and 110 are nodes of the cluster. Thus, the network interfaces are grouped into nodes of the cluster. For example, network interfaces 211, 213, and 215 are grouped into a first node 108, while network interfaces 221, 223, and 225 are grouped into a second node 110. While the embodiment illustrated in FIG. 2 has three network interfaces per node (or computer) connected to one network, further embodiments of the present invention can have any number of network interfaces per node, different numbers of network interfaces for different nodes, and network interfaces connected to any number of networks. Preferably, each node has at least two network interfaces connected to each network in order to provide the redundancy that is required for recovery operations. Further, although FIG. 2 shows only two nodes, the present invention supports any number of nodes.

2. Network Configuration for Monitoring

Figure 3:
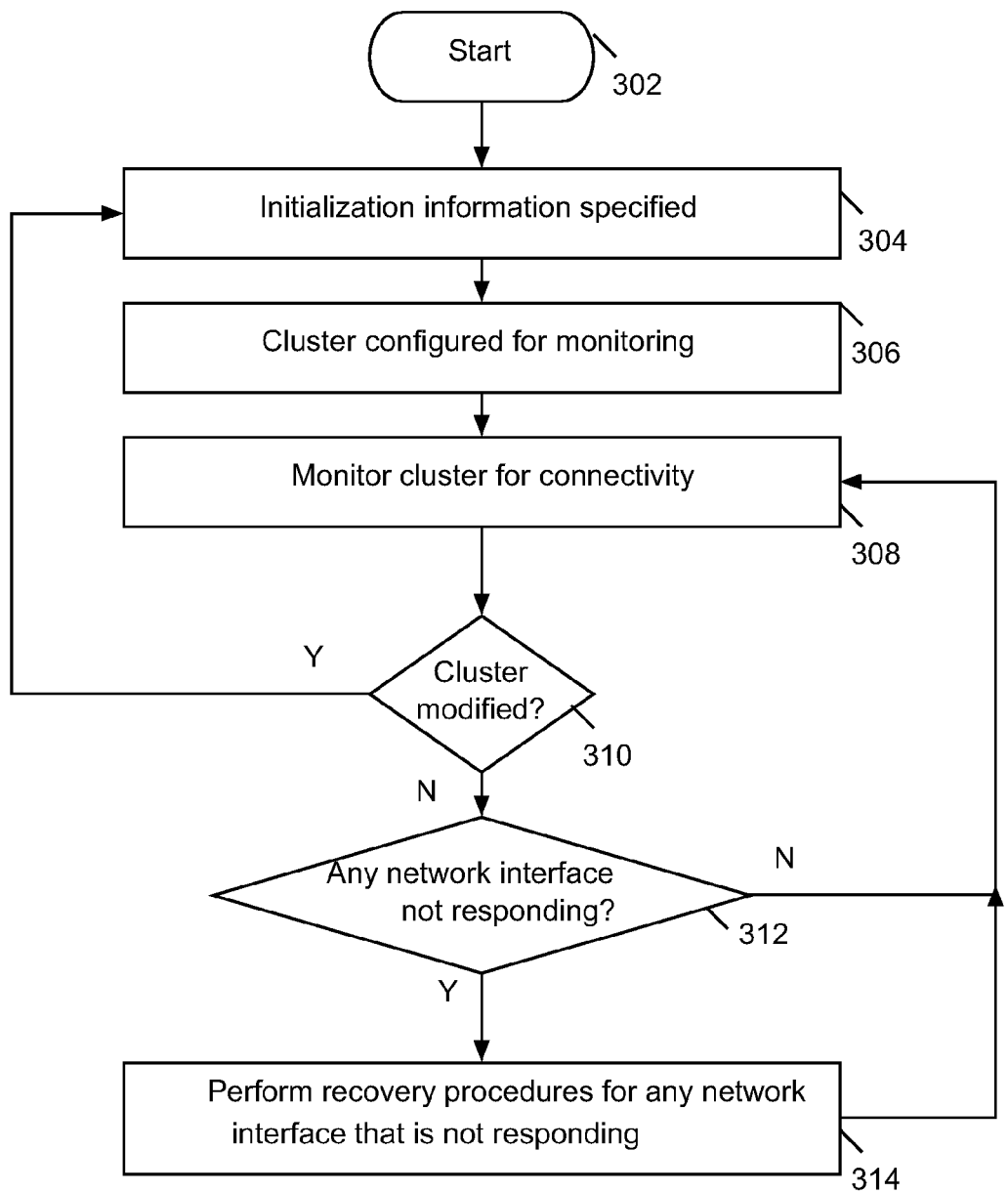
FIG. 3 is a flowchart depicting the overall operation and control flow of one embodiment of the present invention.

FIG. 3 is a flowchart depicting the overall operation and control flow of one embodiment of the present invention. The operation and control flow of FIG. 3 depicts the initialization process of the present invention, the network interface address generation process and the network interface monitoring process. The operation and control flow of FIG. 3 begins with step 302 and proceeds directly to step 304.

In step 304, initialization information is specified. Initialization information includes such information as a base Internet Protocol (IP) address, a subnet mask and a list of logical names of all network interfaces in a cluster. An IP address (a set of four numbers ranging from 0 to 255 separated by decimal points) comprises a network identifier (i.e., the network ID) and a computer (or host) identifier, (i.e., a host ID).

A subnet mask (also a set of four numbers ranging from 0 to 255 separated by decimal points) is a string of 0's and 1's that can be used to separate the network ID and host ID portions of the IP address. For example, a logical "AND" with the subnet mask causes the host ID portion of the IP address to be transformed to 0's so as to produce the network ID. A frequently used subnet mask is 255.255.255.0, where 255 is the decimal equivalent of a binary string of eight ones. This "255.255.255.0" subnet mask can be used to determine the host ID with a subnet of up to 255 host computers.

A list of logical names of all network interfaces in a cluster includes the logical names assigned to each computer or device in a network by an operating system. One example of a list of logical names assigned to each computer or device in a network includes: en0, en1, en2, etc.

In one embodiment of the present invention, step 304 includes the reading of stored initialization information stored by the availability unit 102 or monitor unit. In another embodiment of the present invention, step 304 includes providing a graphical user interface to allow a user to specify the initialization information. This embodiment is described in greater detail below with reference to FIG. 4. In further embodiments, the initialization information is specified through automatic detection and/or user input. For example, in one exemplary embodiment, the availability unit 102 does some configuration discovery of the available network interfaces so that the user does not have to explicitly specify the list of network interfaces. The user can accept or modify the generated list, and then can specify further information such as the base IP address and subnet mask.

In step 306, the network or cluster of computers (as shown in FIGS. 1 and 2) is configured for monitoring by monitor 104. This step includes the generation of network interface addresses for each network interface in the cluster based on the initialization information of step 304. This step further includes automatic assignment of the network interface addresses to each network interface for monitoring by the monitor unit 104. The process of step 306 is described in greater detail below with reference to FIG. 5.

In step 308, the computers 108 through 110 of the network 106 are monitored for connectivity. This typically includes the transmission of monitoring messages between the nodes of the cluster via each of the network interfaces. Based on the reception or non-reception of such monitoring messages, the functionality (i.e., connectivity status) of each network interface is determined. The monitoring process of step 308 is described in greater detail below with reference to FIGS. 6A and 6B.

In step 310, it is determined whether the cluster of FIGS. 1 and 2 has been modified so as to affect the monitoring process of monitor unit 104 or the availability process of availability unit 102. Modification of the cluster can take many forms including a change of a base IP address, a change of a subnet mask and the removal or addition of nodes or network interfaces.

If the cluster has been modified so as to affect the monitoring process of monitor unit 104 or the availability process of availability unit 102, then the control flows back to step 304 where the initialization information is re-specified and the cluster is re-configured in step 306. If the cluster has not been modified so as to affect the monitoring process of monitor unit 104 or the availability process of availability unit 102, then the control flows to step 312 where the monitor unit 104 determines whether or not each network interface is responding. The modification of the cluster so as to affect the monitoring process of monitor unit 104 or the availability process of availability unit 102 is described in greater detail below.

In step 312, monitor unit 104 determines whether any of the network interfaces are not responding. The process of monitoring network interfaces and determining whether a network interface is not responding is described in greater detail below with reference to FIGS. 6A and 6B. If the monitor unit 104 determines that any of the network interfaces are not responding, then control flows to step 314. If the monitor unit 104 determines that all of the network interfaces are responding, then control flows back to step 308.

In step 314, the availability unit 102 proceeds to initiate and perform recovery procedures due to any unavailable network interfaces. Such recovery functions allow the system to recover when one or more network interfaces are not responding. Recovery includes the re-routing of communications from a non-responsive network interface to another responsive network interface. Thus, business-critical applications can be provided with the required continuous, uninterrupted availability. To this end, the availability unit 102 switches the affected line of communication from the non-responsive network interface to another network interface (on the same computer or on a mirror computer offering the same critical data or applications). For example, the affected base address or service address (i.e., the address through which network clients access an application on the server) can be moved to the new network interface to re-route the communications through the other network interface. The HACMP software includes the recovery and restart functionality of such an availability unit 102. Returning to FIG. 3, subsequent to step 314, control flows back to step 308.

Thus, the foregoing embodiments of the present invention allow for the seamless allocation of monitoring addresses to network interfaces in a cluster computer environment. Such embodiments allow a user to allocate base addresses to the network interfaces without regard to any requirements of the monitoring process. Subsequently, static monitoring addresses are allocated to the network interfaces, with the monitoring addresses adhering to the address requirements of the monitoring process.

Figure 4:
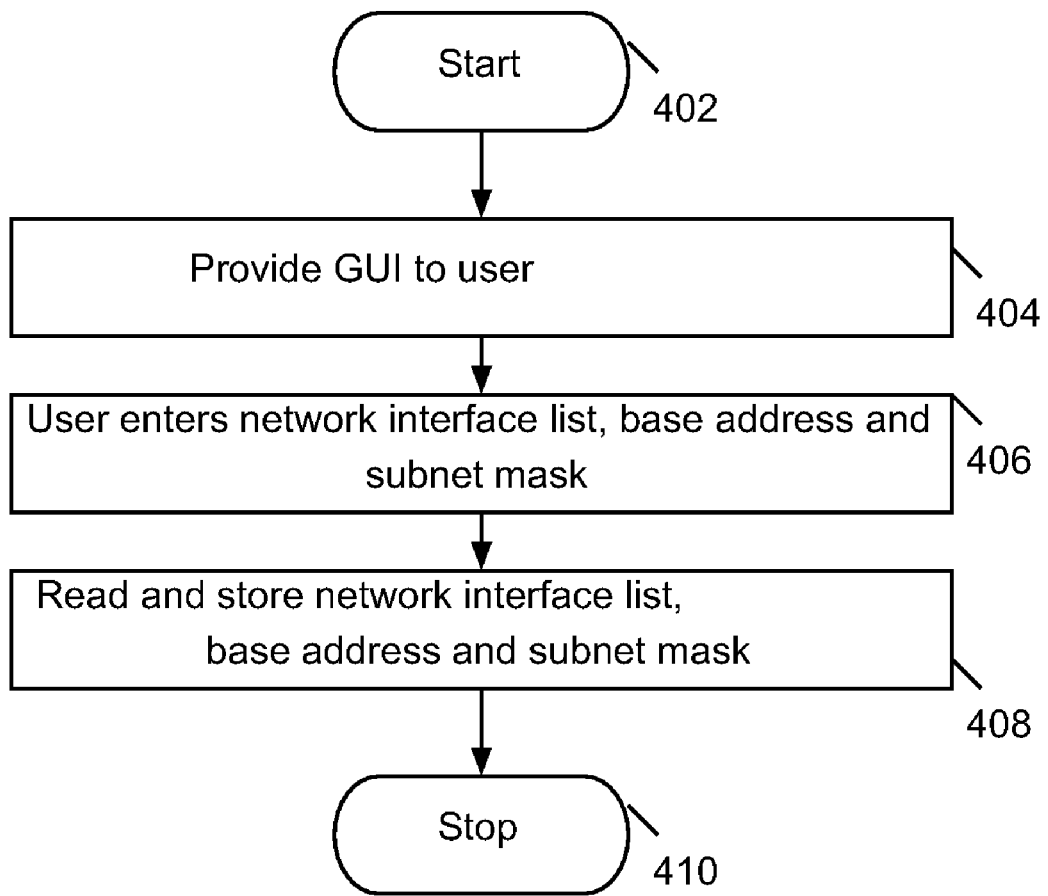
FIG. 4 is a flowchart depicting the operation and control flow of the initialization process of one embodiment of the present invention.

FIG. 4 is a flowchart depicting the operation and control flow of the initialization process of one embodiment of the present invention. FIG. 4 provides more detail regarding the function described in step 304 of FIG. 3. The operation and control flow of FIG. 4 depicts the initialization process in which the initialization information is assimilated for subsequent use in the interface address generation process. The operation and control flow of FIG. 4 begins with step 402 and proceeds directly to step 404.

In step 404, a graphical user interface is provided to a user by the availability unit 102 for input of initialization information, including such information as a base Internet Protocol (IP) address, a subnet mask and a list of logical names of all interfaces in a cluster. Alternatively, the graphical user interface of step 404 can be provided by the monitor unit 102, or a separate unit or system. In step 406, a user enters or supplies the initialization information into the graphical user interface.

In step 408, the availability unit 102 (or the monitor unit 104) reads and stores the initialization information entered into the graphical user interface. The initialization information is assimilated for subsequent use in the interface address generation process described in greater detail below with reference to FIG. 5. In step 410, the control flow of FIG. 4 ends.

Figure 5:
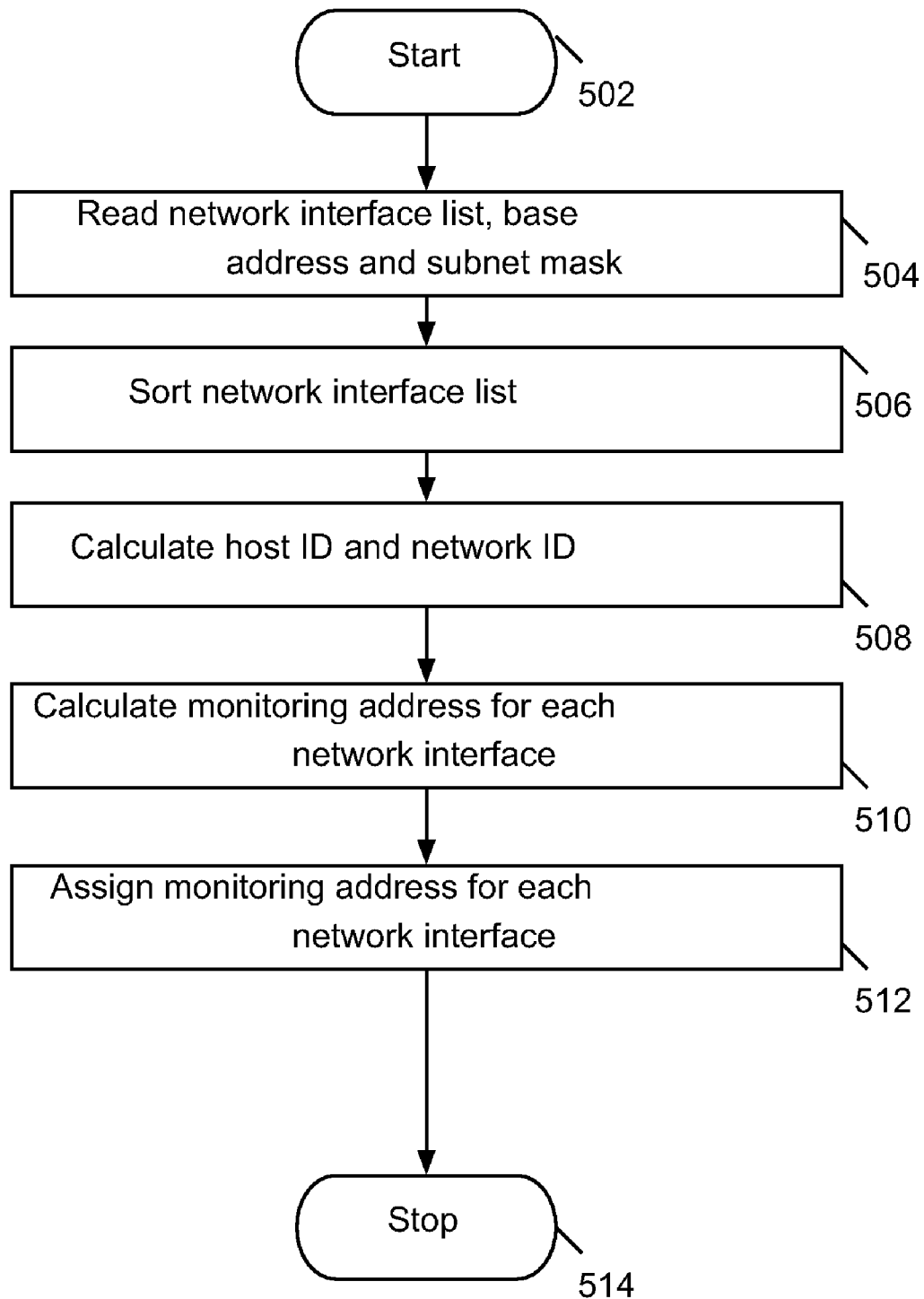
FIG. 5 is a flowchart depicting the operation and control flow of the network interface address configuration process of one embodiment of the present invention.

FIG. 5 is a flowchart depicting the operation and control flow of the network interface address configuration process of one embodiment of the present invention. FIG. 5 provides more detail regarding the function described in step 306 of FIG. 3. The operation and control flow of FIG. 5 depicts the process of calculating network interface addresses for use in the monitoring process (i.e., monitoring addresses). The operation and control flow of FIG. 5 begins with step 502 and proceeds directly to step 504.

In step 504, the initialization information specified in step 304 (namely, the base IP address, subnet mask and a list of logical names of all network interfaces in the cluster) is read by the availability unit 102 (or the monitor unit 104). In step 506, the network interfaces in the list are sorted by logical interface name and node order by the availability unit 102 (or the monitor unit 104).

In step 508, the network ID and the host ID of the network interfaces are calculated by the availability unit 102 (or the monitor unit 104) based on the base IP address and subnet mask. The network ID portion of the base address is calculated by performing a logical AND of the base address and the subnet mask. The host ID portion of the base address is calculated by performing a logical AND of the base address and inverse of the subnet mask.

For example, consider the following base address written in base ten and hex:

10.10.10.42 0a.0a.0a.2a

Consider the following subnet mask written in base ten and hex:

255.255.255.128 ff.ff.ff.80

The logical AND'ing of the base address and the subnet mask produces the network ID as follows:

0a.0a.0a.2a AND ff.ff.ff.80=0 a.0a.0a.00

The logical AND'ing of the base address and the inverse of the subnet mask produces the host ID in the following way:

0a.0a.0a.2a AND 00.00.00.7f=00.00.00.2a

In order to calculate different subnets of a base address, the network ID portion of the base address is incremented by the inverse of the subnet mask+1 (otherwise known as the "subnet increment"), which here is:

00.00.00.7f+1=00.00.00.80

In step 510, the monitoring address for each of the network interfaces is calculated by the availability unit 102 (or the monitor unit 104) based on the network ID and the host ID calculated above. (The monitoring address is the address used in the monitoring process.)

In the preferred embodiment, the first network interface of each node is assigned a monitoring address that is offset from the base address by the node index (i.e., the sequential number of a node). Continuing the example above, the first set of network interfaces (comprising the first network interface in each node) is therefore assigned as follows:

Node 0, adapter 0=10.10.10.42

Node 1, adapter 0=10.10.10.43

Node 2, adapter 0=10.10.10.44

The second network interface in a node must be on a different subnet than the first network interface in that node. As explained above, one of the requirements of the heartbeat technology is that each network interface on a node must be on a different subnet than all other network interfaces on that node. Therefore, for the second network interface of each node, the network ID portion of the base address is modified by adding the subnet increment to the original network ID and then AND'ing with the original host ID. Continuing the example above gives the following:

| 0a.0a.0a.00 | | original network ID | |
|---|---|---|---|
| 00.00.00.80 | | increment | |
| 0a.0a.0a.00 | + | 00.00.00.80 = | 0a.0a.0a.80 |
| 0a.0a.0a.80 | AND | +00.00.00.2a = | 0a.0a.0a.aa |

Thus, the first address for the next subnet is 0a.0a.0a.aa. Again, the second network interface of each node is assigned a monitoring address that is offset from the base address for this subnet by the node index. Continuing the example above, the second network interface in each node is therefore assigned as follows:

Node 0, adapter 1=10.10.10.170

Node 1, adapter 1=10.10.10.171

Node 2, adapter 1=10.10.10.172

This process is repeated until a monitoring address has been calculated for each of the network interfaces in the cluster.

The end result of these address calculations is a dense allocation of network interface addresses. In other words, the calculations produce a matrix (or array) of monitoring addresses, with the network interfaces being the columns and the nodes being the rows. It should be noted that if all of the nodes do not have the same number of network interfaces, then a hole is left in the array for each "missing" network adapter. This occurs because the monitoring address for each network adapter is dependent on the node index for its node.

Further, to avoid multiple subnet routes as described above, it must be verified that the monitoring addresses calculated for use by the monitoring process are sufficiently separated (in the subnet) from the recovery addresses used by the recovery process. In the preferred embodiment, this is verified when the monitoring addresses are calculated. More specifically, each calculated monitoring address is compared to the entire list of recovery addresses to ensure that no two addresses fall in the same subnet range. If such a condition is detected, the user is required to enter a new base address or subnet mask, and the monitoring address calculation and verification procedure is repeated until no address conflicts exist.

In step 512, the calculated monitoring addresses are assigned by the availability unit 102 (or the monitor unit 104) to each of the network interfaces, for use in the monitoring process by the monitor unit 104. In the preferred embodiment, the calculated monitoring addresses are assigned to the network interfaces as additional network interface addresses using IP aliasing, which is a feature of the IP protocol that allows for the assignment of one or more additional IP addresses to a network interface. More specifically, the first (or primary) address assigned to a network interface is known as the "base" address for the network interface. The calculated monitoring address is assigned to the network interface as an "additional" (or "secondary" or "alias") address of the network interface for use by the monitoring process for monitoring purposes. Because the monitoring address is assigned to the network interface as an alias address, as long as the primary address or a different alias address is used as the recovery address for that network interface, the monitoring address does not interfere or interact with the recovery address or any actions associated with the recovery process or recovery operations. In further embodiments, any other mechanism can be used to assign the additional network interface address to be used for monitoring to each network interface.

After assignment, the monitoring addresses are passed to monitoring unit 104 for use in the monitoring process. In the preferred embodiment, the monitoring unit 104 reads the monitoring addresses from an assigned address list that was stored by the availability unit 102. Thus, the automatically-generated monitoring addresses are used in the monitoring process for monitoring the functionality of the network interfaces, instead of using other addresses such as the recovery addresses used by the recovery function. Preferably, the monitoring process only has knowledge of the monitoring addresses of the network interfaces, and does not have any knowledge of the recovery addresses or recovery operations. In step 514, the control flow of FIG. 5 stops.

3. Modifying the Network

As described above, in step 310 of FIG. 3 it is determined whether the cluster has been modified so as to affect the monitoring process of monitor unit 104 or the availability process of availability unit 102. Modification of the cluster can take many forms including a change of base IP address, a change of subnet mask and the removal or addition of nodes or network interfaces. If the cluster has been modified so as to affect the monitoring process of monitor unit 104 or the availability process of availability unit 102, then the initialization information is re-specified and the cluster is re-configured in step 306. This section describes the process of re-specifying the initialization information and re-configuring the cluster.

In the case where the base address or subnet mask is modified, the existing address allocations must be redistributed within the new address and subnet range. The only requisite for changing the base address or subnet mask is that there must be sufficient space in the subnet for the number of adapters and nodes.

The re-allocation of addresses is similar to the initial allocation of addresses. First, the monitor unit 104 sorts the network interfaces in the list by logical interface name and node order. New aliases are assigned at the same network and address offset in the new network range. For example:

| | |
|---|---|
| Current base address | 192.9.201.1 |
| Current subnet mask | 255.255.255.0 |
| Current alias address | 192.9.202.4 |
| Network ID offset of the current alias | 192.9.202.0 − 192.9.201.0 = 1 |
| Host ID offset of the current alias | 0.0.0.4 − 0.0.0.1 = 3 |
| New base address | 10.10.10.42 |
| New subnet mask | 255.255.255.128 |
| New network ID | 10.10.10.0 |
| New host ID | 0.0.0.42 |
| New increment (inverse of the subnet mask +1) | 128 |

Thus, the new alias address network ID is the new network ID plus the current network ID offset multiplied by the new increment:

10.10.10.0+(128*1)=10.10.10.128

Also, the new alias host ID is:

0.0.0.42(new host ID)+0.0.0.3(Host ID offset)=0.0.0.45

Therefore, the new alias address is:

10.10.10.128+0.0.0.45=10.10.10.173

In the event that a node or network interface is removed from the network, the remaining network interfaces preferably retain their existing allocations. Network interface addresses will not slide to a different node or network interface to maintain a dense allocation. In the event that a network interface is added to the network and there are no unallocated addresses in the existing range of network interface addresses, the network interface is preferably added at the end of the existing address allocations and in a new subnet. Otherwise the network interface will be given one of the unallocated addresses in the existing range of network interface addresses. The addition of nodes to the network is similar to the addition of network interfaces to the network.

Figure 6A:
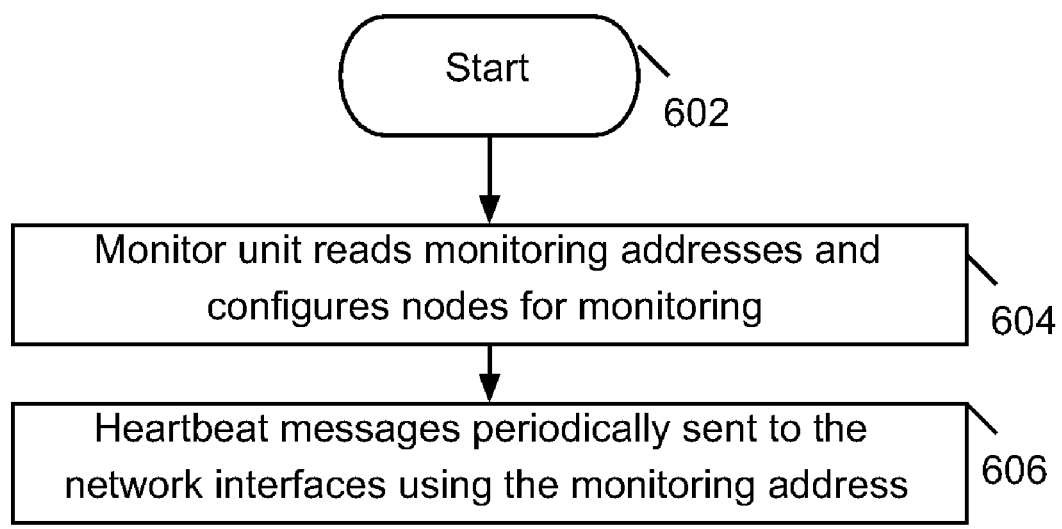
FIGS. 6A and 6B are flowcharts depicting the operation and control flow of the monitoring process of one embodiment of the present invention.
Figure 6B:
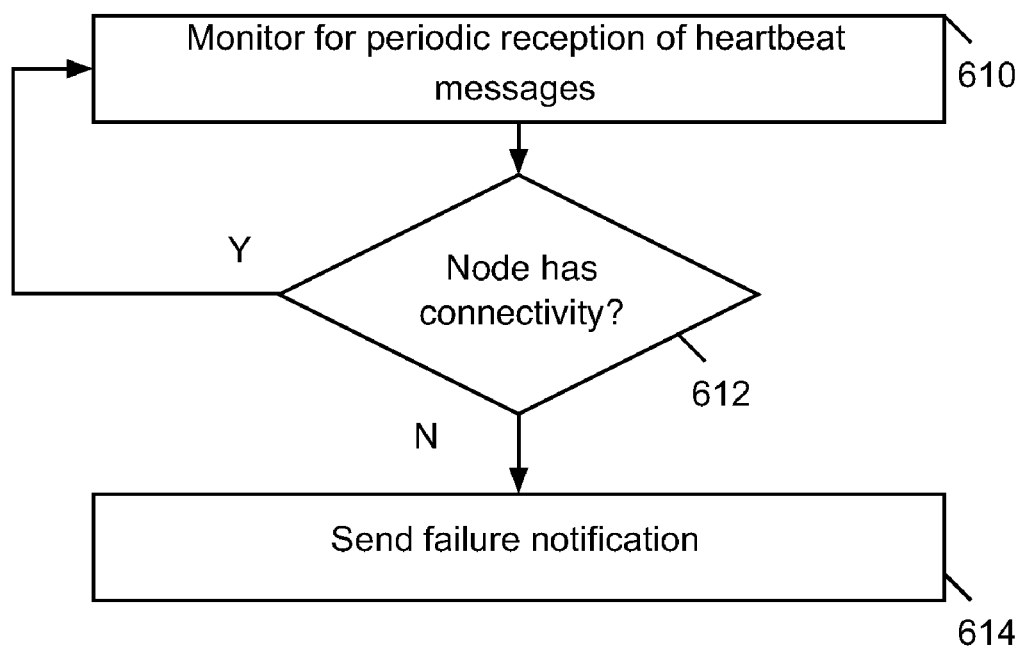

FIGS. 6A and 6B are flowcharts depicting the operation and control flow of the monitoring process of one embodiment of the present invention. FIGS. 6A and 6B provide more detail regarding the function described in step 308 of FIG. 3. The operation and control flows of FIGS. 6A and 6B depict the monitoring process in which network interfaces are monitored for connectivity. The operation and control flow of FIG. 6A begins with step 602 and proceeds directly to step 604.

In step 604, the network interface monitoring process is configured. In the preferred embodiment, the monitor unit 104 reads the network interface list to determine the monitoring addresses of the network interfaces in each subnet. The monitor unit 104 then configures each node of the cluster so that it monitors a network interface that is on the same subnet but a different node. For example, if nodes 1, 2, and 4 are the nodes having a network interface with a monitoring address on a given subnet, then node 1 is configured to send monitoring messages to node 2 (via its network adapter on the subnet), node 2 is configured to send monitoring messages to node 4, and node 4 is configured to send monitoring messages to node 1. In this manner, each node is configured to send monitoring messages to one remote network interface on the same subnet, and to monitor reception of monitoring messages from another node on the same subnet.

In step 606, monitoring messages (e.g., heartbeat messages, ping messages or some other type of messages) are periodically sent to the network interfaces using the monitoring addresses. In the preferred embodiment, each node periodically sends a monitoring message to a remote network interface on the same subnet via its monitoring address in accordance with the configuration set up in step 604.

In step 610, periodic reception of the monitoring messages is monitored to determine the functionality of each of the network interfaces. As described above, in the preferred embodiment each node should periodically receive a monitoring message from another node via its network adapter on the same subnet. Each node must monitor reception or non-reception of these periodic monitoring messages. Based on the result of this monitoring, it is determined whether or not the sending node has connectivity in step 612.

In the preferred embodiment, if a node receives the periodic monitoring message, then it is determined that the sending node has connectivity and control flows back to step 610. On the other hand, if the node does not receive the periodic monitoring message due to a malfunction of the sending network interface or some other error, then it is determined that the sending network interface of the sending node does not have connectivity (or is not functioning properly) and control flows to step 614. Preferably, a threshold is used in making this determination so that a lost or delayed message or network congestion does not cause a false failure determination. In other words, it is determined that the sending network interface does not have connectivity only if no monitoring message is received for a threshold number of message periods (or within some predetermined time period).

In further embodiments, the monitor unit (or some other central unit) periodically sends the monitoring messages to all of the network interfaces, and a reply is returned to confirm the reception of each monitoring message. In such embodiments, the monitor unit (or other central unit) would determine connectivity status based reception or non-reception of the reply messages.

In step 614, a failure notification is sent so as to allow the recovery process to perform a recovery operation. In the preferred embodiment, when a node does not receive an expected periodic monitoring message within some predetermined time period, the node sends a failure message to the monitor unit (or some other unit or node such as the group leader for that monitoring group). In response, the monitor unit (or other unit or node) sends a failure notification to the recovery process, which translates such notifications into events that are relevant to the recovery process.

For example, in one embodiment the monitoring process delivers a failure notification for the monitoring address. In response, the recovery process determines the network interface that is currently assigned that monitoring address based on the network interface name, and then determines any addresses for recovery that are also assigned to that network interface. The recovery process then performs the appropriate recovery action using the recovery addresses for that network interface. Thus, the address mapping of the recovery process makes the monitoring process and failure response transparent to the user.

When the recovery process is terminated, the recovery process shuts down the monitoring process and removes the monitoring addresses from the network interfaces.

4. Exemplary Implementations

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general-purpose computer with a computer program that, when being loaded and executed, controls the computer such that it carries out some or all of the methods described herein.

An embodiment of the present invention can also be embedded in a computer program product that comprises some or all of the features enabling the implementation of the methods described herein, and which—when loaded in a computer system—is able to carry out these methods. Computer program means or computer program as used in the present invention indicates any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer system to read such computer readable information.

Figure 7:
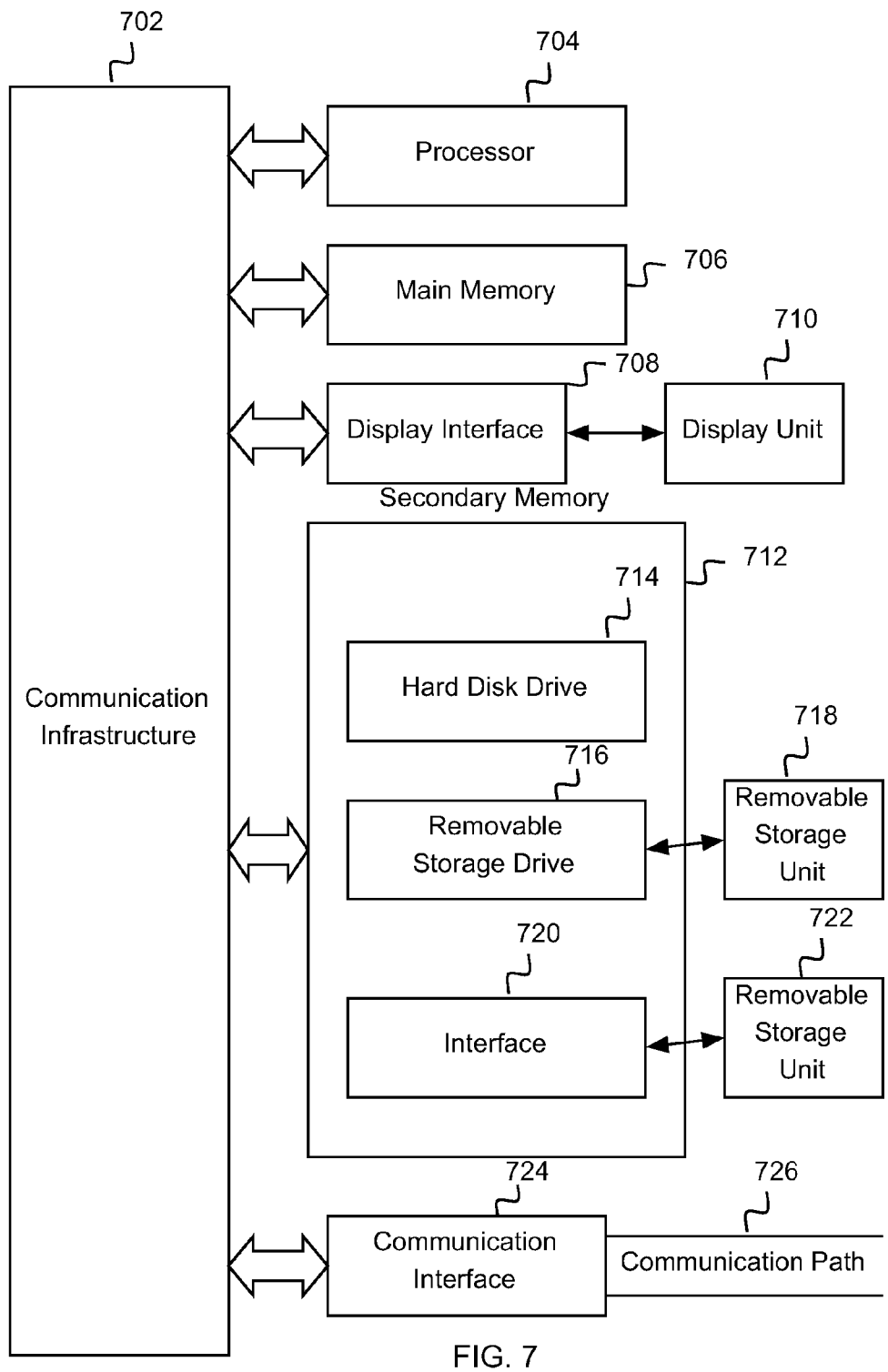
FIG. 7 is a block diagram of a computer system useful for implementing embodiments of the present invention.

FIG. 7 is a block diagram of a computer system useful for implementing an embodiment of the present invention. For example, the computer system of FIG. 7 can be a more detailed representation of the monitor unit or one of the computers connected to the network. The computer system of FIG. 7 includes one or more processors, such as processor 704. The processor 704 is connected to a communication infrastructure 702 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 708 that forwards graphics, text, and other data from the communication infrastructure 702 (or from a frame buffer not shown) for display on the display unit 710. The computer system also includes a main memory 706, preferably random access memory (RAM), and may also include a secondary memory 712. The secondary memory 712 may include, for example, a hard disk drive 714 and/or a removable storage drive 716, representing a floppy disk drive, a magnetic tape drive, an optical disk drive, etc. The removable storage drive 716 reads from and/or writes to a removable storage unit 718 in a manner well known to those having ordinary skill in the art. Removable storage unit 718, represents, for example, a floppy disk, magnetic tape, optical disk, etc. which is read by and written to by removable storage drive 716. As will be appreciated, the removable storage unit 718 includes a computer usable storage medium having stored therein computer software and/or data.

In alternative embodiments, the secondary memory 712 may include other similar means for allowing computer programs or other instructions to be loaded into the computer system. Such means may include, for example, a removable storage unit 722 and an interface 720. Examples of such may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to the computer system.

The computer system may also include a communications interface 724. Communications interface 724 allows software and data to be transferred between the computer system and external devices. Examples of communications interface 724 may include a modem, a network interface (such as an Ethernet card), a communications port, a PCMCIA slot and card, etc. Software and data transferred via communications interface 724 are in the form of signals which may be, for example, electronic, electromagnetic, optical, or other signals capable of being received by communications interface 724. These signals are provided to communications interface 724 via a communications path (i.e., channel) 726. This channel 726 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 706 and secondary memory 712, removable storage drive 716, a hard disk installed in hard disk drive 714, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information.

Computer programs (also called computer control logic) are stored in main memory 706 and/or secondary memory 712. Computer programs may also be received via communications interface 724. Such computer programs, when executed, enable the computer system to perform the features of the present invention as discussed herein. In particular, the computer programs, when executed, enable the processor 704 to perform the features of the computer system. Accordingly, such computer programs represent controllers of the computer system.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A method for monitoring functionality of a plurality of network interfaces and providing fault recovery, the network interfaces being grouped into a plurality of nodes and a monitoring address being assigned to each of the network interfaces such that the monitoring address for each of the network interfaces is on a different subnet than the monitoring addresses for all of the other network interfaces in the same node as that network interface, the method comprising the steps of:

periodically sending a monitoring message to each of the network interfaces via the monitoring addresses in order to determine the functionality of the network interfaces;

if no monitoring message is received within a predetermined period, performing a recovery operation for one of the network interfaces using one or more recovery addresses of the one network interface, wherein each of the network interfaces is assigned the one or more recovery addresses that each are different than its monitoring address; and automatically generating the monitoring addresses for the network interfaces, said automatically generating the monitoring addresses for the network interfaces including:

generating the monitoring address for a first network interface in each node by adding a base address to a node index for that node; and generating the monitoring address for a second network interface in each node using the node index for that node in the formula:

((network ID+subnet increment) AND host ID)+node index, wherein the network ID and the host ID are based on the base address and a subnet mask, and the subnet increment is based on the subnet mask.

2. The method of claim 1, wherein the performing step includes the sub-step of:

if no monitoring message is received within the predetermined period, sending a failure notification with the monitoring address of the one network interface.

3. The method of claim 2, wherein the performing step further includes the sub-steps of:

determining the one or more recovery addresses to be recovered based on the monitoring address in the failure notification; and performing the recovery operation for the one network interface using the one or more recovery addresses of the one network interface.

4. A computer readable storage medium having computer-executable instructions encoded thereon for monitoring functionality of a plurality of network interfaces and providing fault recovery, the network interfaces being grouped into a plurality of nodes and a monitoring address being assigned to each of the network interfaces such that the monitoring address for each of the network interfaces is on a different subnet than the monitoring addresses for all of the other network interfaces in the same node as that network interface, said computer-executable instructions performing a method comprising the steps of:

periodically sending a monitoring message to each of the network interfaces via the monitoring addresses in order to determine the functionality of the network interfaces;

if no monitoring message is received within a predetermined period, performing a recovery operation for one of the network interfaces using one or more recovery addresses of the one network interface, wherein each of the network interfaces is assigned the one or more recovery addresses that each are different than its monitoring address; and automatically generating the monitoring addresses for the network interfaces, said automatically generating the monitoring addresses for the network interfaces including:

generating the monitoring address for a first network interface in each node by adding a base address to a node index for that node; and generating the monitoring address for a second network interface in each node using the node index for that node in the formula:

((network ID+subnet increment) AND host ID)+node index, wherein the network ID and the host ID are based on the base address and a subnet mask, and the subnet increment is based on the subnet mask.

5. The computer readable storage medium of claim 4, wherein the performing step includes the sub-steps of:

if no monitoring message is received within the predetermined period, sending a failure notification with the monitoring address of the one network interface;

determining the one or more recovery addresses to be recovered based on the monitoring address in the failure notification; and performing the recovery operation for the one network interface using the one or more recovery addresses of the one network interface.

* * * * *